July 30, 1940.          C. A. MUREAU          2,209,789
MIRROR FOR LIPSTICKS AND THE LIKE
Filed June 14, 1938
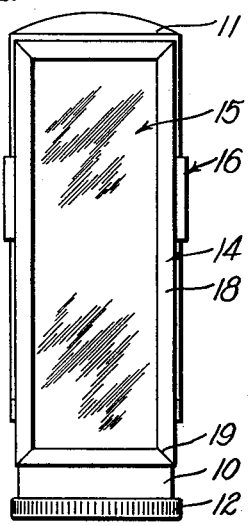
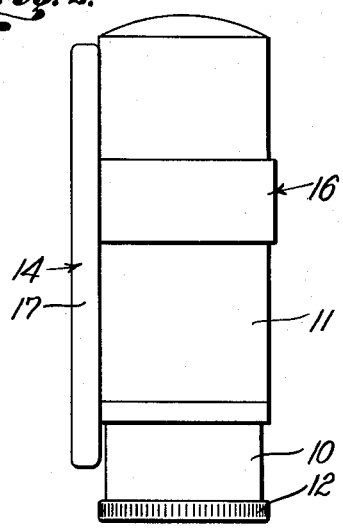
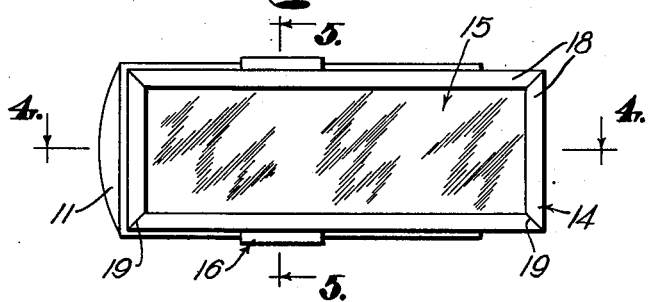
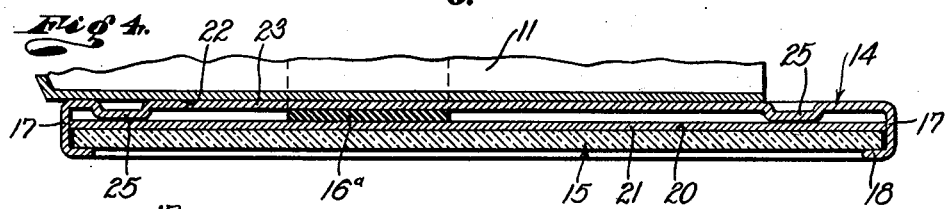
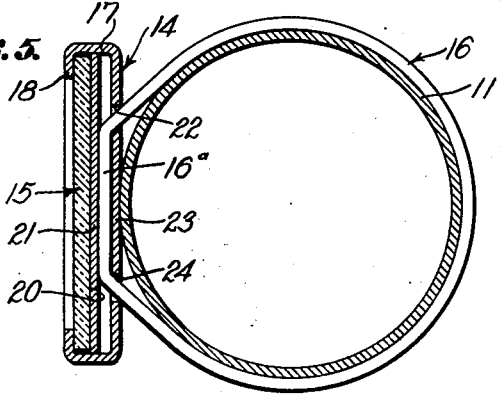
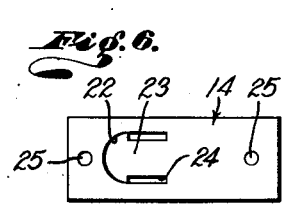
Inventor
CHARLES A. MUREAU
By
His Attorney Patented July 30, 1940

2,209,789

UNITED STATES PATENT OFFICE 2,209,789

MIRROR FOR LIPSTICKS AND THE LIKE

Charles A. Mureau, Los Angeles, Calif.

Application June 14, 1938, Serial No. 213,614

2 Claims. (Cl. 88—97)

This invention relates to mirrors and relates more particularly to mirrors useful in connection with lipsticks and cosmetic applicators of various forms. A general object of this invention is to provide a simple, practical and effective mirror having means for facilitating its connection with cosmetic applying devices such as lipstick holders, etc.

When lip rouge and other cosmetics are being applied it is usually necessary to employ a mirror. It is customary for women to carry mirrors in their handbags for this purpose, but these handbag mirrors are usually quite large and unsightly, and are not always available when required.

Another object of this invention is to provide a mirror that may be easily and quickly secured to a cosmetic applicator such as a lipstick holder to be always available and immediately accessible when the cosmetic is to be applied.

Another object of this invention is to provide a mirror having a novel yet simple means for dependably attaching it to the cover or cap of a lipstick holder, or like article.

Another object of this invention is to provide a mirror of the character mentioned in which the attaching or securing means is capable of dependably securing the mirror to devices or articles varying considerably in size and shape.

Another object of this invention is to provide a mirror of the character mentioned that may be easily and quickly removed from the device to which it is applied for use on other articles or devices, or for use unattached.

Another object of this invention is to provide a mirror of the character mentioned that is small and compact and that is shaped and proportioned so that the lips, the eyes, etc., may be fully and clearly seen, to facilitate the application of cosmetics.

Another object of this invention is to provide a mirror in which the glass reflecting element is supported in such a manner that it is protected against breaking pressures and forces.

A further object of this invention is to provide a mirror of the character mentioned that is simple and very inexpensive to manufacture.

The various objects and features of my invention will be fully understood from the following detailed description of a typical preferred form and application of the invention, throughout which description reference is made to the accompanying drawing, in which:

Fig. 1 is a front view of the mirror provided by this invention showing it in position on a lipstick holder. Fig. 2 is a side elevation of the mirror and lipstick holder. Fig. 3 is a front view of the mirror and the cap of the holder showing the cap removed from the holder. Fig. 4 is an enlarged fragmentary longitudinal detailed sectional view taken as indicated by line 4—4 on Fig. 3. Fig. 5 is an enlarged transverse detailed sectional view taken as indicated by line 5—5 on Fig. 3, and Fig. 6 is a reduced elevation of the rear side of the mirror body with the band removed.

The mirror of the present invention is adapted for use in various situations and may be applied to cosmetic applicators and other articles of different sizes, types and kinds. In the drawing I have shown a typical form of the invention applied to or used on a lipstick holder. It is to be understood that the invention is not to be limited by this particular form or application of the invention.

The typical lipstick case or holder illustrated in the drawing includes a socket or body member 10 in which the stick or rouge (not shown) is received or carried. A cap 11 is removably telescoped over a part of the member 10 to enclose the lipstick proper. The member 10 has a knurled head 12 by means of which the lipstick may be advanced and retracted in the well known manner. The member 10 is usually grasped or held and employed as a handle to apply the rouge when the cap 11 is removed. In the typical holder illustrated the cap 11 is a cylindrical member closed at one end and open at the other end to engage about a portion of the member 10.

The mirror of the present invention comprises, generally, a frame or body 14, a reflector or reflecting element 15 carried by the body 14, and a resilient attaching member or band 16 on the body 14 for attaching or securing the mirror to the cap 11.

The body 14 is in the nature of a frame or carrier for the reflecting element 15. It is preferred to construct the body 14 of metal and in practice the body is formed of sheet metal, or the like. The body 14 may be plated, burnished or finished in any selected manner. When the mirror is intended for use on a lipstick holder or similar device the body 14 is elongate and is preferably rectangular. The body 14 may be flat except at its margins where it is provided with flanges 17. The flanges 17 project outwardly or forwardly at substantially right angles to the plane of the major body surfaces. Rims 18 are provided on the flanges 17 and are turned inwardly to lie in a plane substantially parallel with the plane of the body 14. The flanges 17 and the rims 18 join or abut at angular corner edges or joints 19 to provide a continuous flange and rim structure. It is to be observed that the body 14 just described may be inexpensively constructed of a single piece of sheet stock or metal.

The reflector or reflecting element 15 is supported in the frame-like body 14 to be exposed for the reflection of light images. In the preferred construction the element 15 is a flat plate of glass silvered or otherwise treated at its inner surface 20 to act as an effective reflector of light. The light reflecting element 15 is shaped and proportioned to be received in the flanges 17 and to be held in place by the rims 18. The edges of the element 15 are in engagement with or adjacent the inner surfaces of the flanges 17 and the rims 18 engage inwardly against the outer surface of the element 15 along its margins. It will be apparent how the flanges 17 and rims 18 serve to hold the reflecting element 15 against loss and shifting. The flanges 17 and the rims 18 serve to protect the edge portions of the fragile reflecting element 15.

In accordance with the invention a supporting plate 21 is arranged under or at the inner side of the reflecting element 15. The plate 21 is in the nature of a shim, being a flat member of metal or other suitable material and is quite thin. As illustrated in the drawing the shim or plate 21 is proportioned to fit within the flanges 17 and lies flat against the silvered inner surface 20 of the element 15. The plate 21 serves to support the fragile reflecting element 15 against inward pressure and forces, serves to distribute such forces so that the element is not readily cracked or broken and protects the silvered surface of the element. Further, the shim or plate 21 facilitates the assembling of the reflecting element 15 in the body 14, as will be hereinafter described.

The band 16 is provided to facilitate the connection of the mirror body 14 to the cap 11 or similar object and is characterized by its adaptability to objects of various sizes, shapes and characters. The band 16 is in the nature of a flexible resilient strap of rubber, rubber composition or a similar material that has a substantial degree of resiliency and flexibility. In the preferred construction the band 16 is continuous or in the nature of a ring and is of substantial width to have extensive engagement with the lipstick cap 11. The attaching band 16 extends or projects from the rear side of the mirror body 14 to have the longitudinal axis of its opening substantially parallel with the plane of the flat plate-like body 14 and the reflecting element 15. The size or diameter of the band 16 is such that it may be readily made to engage about and grip the lipstick cap 11 and the parts and caps of cosmetic containing and applying devices of various diameters.

The invention provides simple yet very dependable means for securing the attaching band 16 to the body 14. A substantially U-shaped cut 22 is made in the flat major portion of the body 14 to define or outline a flap 23. In the preferred construction the cut 22 is in spaced relation to one end of the elongate body 14 and is equally spaced between the opposite longitudinal edges of the body. The branches or side parts of the U-shaped cut 22 are preferably substantially parallel with the longitudinal edges of the body. The portion of the cut 22 connecting its side parts may be curved or rounded as illustrated. The arms or side parts of the U-shaped cut 22 are increased in width to provide a pair of spaced parallel elongate openings 24.

In assembling the attaching band 16 to the body 14 the flap 23 is moved or bent out of the plane of the platelike body 14 and the band 16 is passed over or behind the flap so that spaced parts of the band are received in the openings 24. The flap 23 is then bent back to the plane of the body 14 to have its faces flush with the body surfaces. The openings 24 are proportioned so that the band 16 is tightly held in them when the flap 23 is returned to the position illustrated in the drawing. The character of the metal of which the body 14 is formed and the fit of the flap 23 in the cut 22 are such that the flap remains in flush relation with the surfaces of the body following the connection of the band 16 to the body. It is preferred to peen the body 14 or the flap 23, or both, at the intermediate portion of the cut 22 to positively prevent the outward bending of the flap 23. The band 16 secured to the body 14 in the manner just described projects from the rear surface of the body to form an eye or loop on the body. It will be seen that the band 16 arranged as described above has a portion 16ª extending across the face of the flap 23 at the interior or inner side of the body 14. The band 16 is assembled on the body 14 prior to the assembly of the reflecting element 15 and the plate 21 on the body. When the reflecting element 15 and the plate 21 are assembled on the body 14 the rear or inner side of the plate 21 engages or bears rearwardly against the portion 16ª of the band 16.

The invention provides means for yieldingly supporting the reflecting element 15 and for distributing the forces or pressures that may be imposed on the reflecting element 15 and the plate 21 so that the element 15 is not easily broken. This means comprises one or more raised parts 25 on the body 14 for engagement by the plate 21. In the preferred construction illustrated in the drawing there is a raised part 25 provided on the body 14 adjacent each of its ends to assist in supporting the plate 21 or for limiting the movement of the plate. The supporting parts 25 are spaced in opposite directions from the band portion 16ª. The parts 25 may be provided or formed by bending or indenting the body 14 from its rear side. The parts 25 may be simple knobs or round projections. The band portion 16ª constitutes the supporting element for the shim or plate 21 and reflecting element 15 and serves to yieldingly maintain the plate in even engagement with the rear surface or the inner surface 20 of the reflecting element 15 and to yieldingly hold the reflecting element against the rims 18. As the band portion 16ª is located between the ends of the reflecting element 15 the element and plate 21 may rock or pivot on the band portion. The parts are related so that the parts 25 limit this rocking of the plate 21 and reflecting element 15. It is to be observed that the band portion 16ª forms a yielding cushion or backing for the reflecting element 15 and its plate 21. The plate 21 supported on the yielding band portion 16ª as described above assumes localized pressures that may be put on the fragile reflecting element 15 so that such forces or pressures do not crack or break the element. The parts are related and proportioned so that the rims 18 engage inwardly against the forward surfaces of the reflector element 15 to hold the inner surface 20 of the element in tight engagement with the plate 21 and to hold the plate firmly against the band portion 16a.

The reflecting element 15 and its shim or plate 21 are assembled in the body 14 following the attachment of the band 16 to the body, as described above. One end flange 17 and its rim 18 are left flat or in substantially the same plane as the major part of the body 14 and the rim 18 of the other end flange 17 is only partially turned down. The plate 21 is arranged against the back surface of the reflecting element 15 and the assembly of the reflecting element and plate is passed over the above-mentioned flat end flange 17 and slid under the rims 18 of the long or side flanges 17. During this inward movement of the reflecting element 15 and plate 21 the plate forms a slide or slipper that readily slides over the rubber band portion 16a. Without the shim or plate 21 the more or less uneven and rough silvered rear surface 20 of the element 15 would catch or bind on the rubber band portion 16a and prevent the movement of the fragile reflecting element to its position in the body 14. When the reflecting element 15 and the plate 21 have been brought to the correct position the flat or unformed end flange 17 is bent up to the correct position and the rims 18 of the two end flanges 17 are bent down to their positions in the same plane as the other rims 18. This completes the assembling operations.

It is believed that the utility and practicability of the mirror provided by the present invention will be readily apparent from the foregoing detailed description. When the mirror is to be attached to the cap 11 the band 16 is slid or passed down over one end of the cap 11. The band 16 is proportioned so that it must be stretched or increased in diameter to adapt it for engagement about the cap 11. Accordingly, when the band 16 engages about the cap its inherent resiliency holds the rear surface of the body 14 tightly against the cap 11. The band 16 being formed of rubber, or the like, dependably grips the cap 11 and has no tendency to slip or slide on the cap. Accordingly, the band 16 effectively maintains the mirror in the selected position on the cap 11. It will be obvious that the band 16 may be engaged about parts of cosmetic carriers and applicators of various natures and about other devices to secure the mirror thereto. When the mirror is applied to the cap 11 as illustrated in the drawing its longitudinal axis is parallel with the longitudinal axis of the cap 11 so that the cap forms a dependable backing or support for the mirror. Further, the mirror being arranged on the cap 11 as illustrated, lies flat against the cap and need not project beyond the ends of the lipstick holder. Accordingly, the holder and the mirror form a sightly compact unit.

The mirror provided with the elongate reflecting element 15 may be advantageously employed to facilitate the application of lip rouge, mascara, etc. The element 15 is shaped and proportioned so that the lips may be readily consulted or viewed in it. If it is desired to detach the mirror from the cap 11 the band 16 may be moved along the cap or may be stretched and, while in a stretched state, removed from the cap to disconnect the mirror therefrom. The band 16 may then be utilized to secure the mirror to other objects or devices.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. Means for securing a reflecting element to a cosmetic applicator comprising, a plate-like sheet metal body having a marginal rim engaging about the edge of the reflecting element to secure the element in the body, a plate in the body backing up the element, the body having spaced openings, a rubber ring passing through said openings to have a loop project from the body to grip about the applicator to secure the body thereto and to have a part at the inner surface of the body against which the plate bears, and a raised bearing part on the inner surface of the body spaced from said ring part and against which the plate bears.

2. A holder for mounting a mirror on a lipstick case comprising a sheet metal body having a rim engaging about the edge of the mirror to retain the mirror, the body having a pair of spaced generally rectangular openings joined by a U-shaped cut, the openings and cut defining a flap that may be bent out, a rubber band inserted in said openings when said flap is bent out to extend through the openings and to have a loop project from the rear side of the body for engaging around the lipstick case, and to have a part at the inner side of the body, said flap being returned to its original position in the same plane as the body to retain the band in the openings, indented portions on the body spaced at opposite sides of the said part forming projections on the under side of the body, and a backing plate for the mirror supported by said part and the said portions of the body.

CHARLES A. MUREAU.